3,027,303
HEMATINIC COMPOSITIONS
George L. Wolcott, Asbury Park, N.J., assignor to Bristol-Myers Company, New York, N.Y., a corporation of Delaware
No Drawing. Filed June 4, 1958, Ser. No. 739,668
2 Claims. (Cl. 167—68)

This invention pertains to therapeutic preparations for the treatment and correction of mineral-deficient conditions in humans and animals and more particularly to pharmaceutical hematinic preparations conducive to the restoration of a physiologically normal iron content in the blood.

Various types of hypochromic microcytic anemias are known and are commonly encountered in several pathologic conditions such as chronic blood loss, nutritional hypochromic anemia and hypochromic anemias of pregnancy, infancy and childbirth. The basic etiologic factor in all hypochromic anemias is the depletion of the body's iron supplies. Many pharmaceutical hematinic preparations are known and used, such as ferric albuminate, ferric ammonium citrate, ferric ammonium tartrate, ferric cacodylate, ferric chloride, ferric citrate, ferric hydroxide, soluble ferric phosphate, ferric potassium tartrate, soluble ferric pyrophosphate, ferric quinine citrate, ferric valerate, saccharated iron oxide, ferrous carbonate, saccharated ferrous carbonate, ferrous chloride, ferrous gluconate, ferrous iodide, ferrous lactate and ferrous sulfate. Such prior art compositions, when orally administered, often have the disadvantage of producing physiologic disturbances such as nausea, cramps, epigastric distress, diarrhea, or, more commonly, constipation. Hence it is often permissible to administer such preparations only after meals, beginning the therapy with a very small dosage and only gradually increasing the dosage to a therapeutically effective level.

The gastrointestinal discomfort commonly associated with the administration of prior art hematinic preparations is believed to be due, in large part, to the sudden release, in the gastrointestinal tract, of large quantities of iron which, due to its highly astringent nature, irritates the gastrointestinal tissues.

Therefore, it is an object of the present invention to provide a pharmaceutical preparation for the treatment of iron-deficient anemias in humans.

It is a further object of the invention to provide a pharmaceutical hematinic preparation which is non-constipating.

It is still another object to provide a non-constipating hematinic preparation which is non-irritating to the gastrointestinal tissues and which will not produce the gross abdominal discomfort commonly associated with prior art hematinic preparations.

In accordance with the foregoing objects a preferred embodiment of the present invention comprises a pharmaceutical preparation for the treatment of anemia which comprises an iron salt of certain resinous polymers such as those disclosed in United States Patent No. 2,798,053 to Harold P. Brown. The portion of the disclosure of that patent which is contemplated for producing the novel compositions of the present invention is directed to non-toxic, non-irritant, colloidally water-dispersible, gellable interpolymers of a monomeric, polymerizable, alpha-beta monoolefinically unsaturated, lower aliphatic carboxylic acid crosslinked with a monomeric polyether of an oligo saccharide having at least two hydroxy groups etherified with allyl groups. Particularly useful polymers include those containing from about 0.1 to about 4.0 percent of the polyether and those comprising acrylic acid crosslinked with from about 0.75 to about 1.5 percent, by weight of polymer, of allyl sucrose are preferred. Thus, a polymer suitable for the production of the novel compositions of the invention is sold under the trademark "Carbopol." This is a copolymer of acrylic acid and allyl sucrose and is prepared in accordance with the disclosure of the aforementioned Patent No. 2,798,053. This polymer, hereinafter referred to as "P.A.A.," is, in itself, non-toxic when ingested in large quantities as proved by extensive in vivo animal and human tests.

It has now been found that iron salts of such polymers may be prepared by dispersing the polymers in a suitable medium which will not react chemically with the polymers nor with an iron salt, the latter being dissolved in any suitable solvent therefor which is chemically inert with respect thereto and to the polymers, and by then mixing the iron-containing solution and the polymer-containing suspension whereby a reaction takes place between iron and polymer to form an insoluble iron-polymer compound. Iron compounds typically suitable for use in such reactions include ferric chloride and ferrous sulfate.

For example, 7.7 grams of P.A.A. was suspended in 20 ml. of water. An aqueous solution containing 9.0 grams (0.033 mol) of ferric chloride, $FeCl_3 \cdot 6H_2O$, in 50 ml. of water was added with agitation. The pH of the suspension was adjusted to between 8 and 9 by the addition of 25 ml. of a 28 percent by weight solution of ammonium hydroxide, whereupon there was added 350 ml. of methanol to prevent a clumping and gelling of the suspension. A fluffy brown precipitate was produced and this material was separated by centrifugation, washed successively with methanol and ethyl ether, air dried for one hour and then oven dried at 120° C. until there was no further evidence of ammonia evolution. The yield of iron-P.A.A. reaction product was 9.6 grams. Quantitative analysis showed that this material had an iron content of 19.5 percent by weight.

A similar procedure, utilizing 13.9 grams of ferrous sulfate, $FeSO_4 \cdot 7H_2O$ in 150 ml. of water added to a suspension of 7.7 grams of P.A.A. in 200 ml. of isopropanol, resulted in the production of a fluffy green precipitate analyzing 19.3 percent iron.

Compounds having lesser iron contents can be produced by using less than the maximum amount of iron salt which will react with the resin. Thus, for example, allyl sucrose-crosslinked acrylic acid salts have been prepared with iron contents varying from about 10 to about 20 precent, by weight thereof, of iron.

Iron compounds other than ferric chloride or ferrous sulfate may be used in the production of the compounds of the invention. Thus, other useful iron compounds include such water-soluble compounds as ferric glycerophosphate, ferric malate, ferric potassium tartrate, ferrous ammonium sulfate, ferrous nitrate, ferrous lactate and ferrous gluconate. Other similar compounds will be apparent to those skilled in the art. Moreover, other inert diluents may be used for suspending the polymer and other solvents may be selected for dissolving the iron-containing reactant, the suitability of such materials being dependent primarily upon their being inert with respect to the reactants and the solubility therein of the iron compound used. For example, if ferric chloride is used as the iron-containing reactant, either ethyl ether or acetone, as well as water, constitutes a suitable solvent.

Alkaline materials other than ammonium hydroxide may be used in adjusting the pH of the reaction media. Thus, alkali metal or alkaline earth metal hydroxides, oxides or basic salts, as well as various amines, such as triethanolamine may be utilized for this purpose.

The beneficial effect of the novel compounds contemplated by this invention in the correction of anemic conditions is illustrated by a number of tests which have been conducted with rats in which anemic conditions were induced by substantially eliminating iron from the diet. The initial red blood cell counts of the anemic rats were from about 3.5 million to about 4.0 million red blood cells per ml. of blood. A number of rats, designated as group A, were fed a normal diet and were used as controls. The average initial red blood cell count of these control animals was about 8.25 million cells per ml. The anemic test animals were divided into three groups, the first, group B, being fed only the iron-deficient diet, the second, group C, were fed the iron deficient diet to which was added 5 mg. per animal of iron-P.A.A. made in accordance with the foregoing procedure utilizing ferrous sulfate as a reactant. The third, group D, were fed the iron deficient diet to which was added 5 mg. of iron-P.A.A. plus 0.25 mg. of copper sulfate per animal. Measurements of the red blood cell counts of the animal was made at 7, 14 and 23 days after beginning the administration of the drugs. The results of these tests are shown in Table I.

TABLE I

*Red Blood Cell Count, Millions/Ml.*

| Group | Days After Initial Administration of Drug | | | |
|---|---|---|---|---|
| | 0 | 7 | 14 | 23 |
| A | 8.00 | 8.25 | 8.40 | 7.75 |
| B | 3.70 | 3.40 | 3.20 | 2.85 |
| C | 3.85 | 4.30 | 5.65 | 5.20 |
| D | 3.45 | 6.05 | 8.70 | 8.80 |

The animals in group B which were fed the non-medicated iron deficient diet showed a continual low level of red blood cells, and in fact, this level slowly decreased throughout the period of the experiments. On the other hand the animals in group C, i.e., those that were fed a diet to which the resinous iron salt was added showed a progressive increase in the number of cells up to about two weeks, after which the count of red blood cells remained approximately constant at a value considerably higher than that observed in the untreated anemic animals. It will also be noted that the red blood cell level of the animals in group D, i.e., those to which both the resinous iron salt and a copper-containing salt were administered, reached much higher levels even than the levels observed in the animals treated with the iron salt alone. The red blood cell count of the animals in group D was, in fact, at a value commensurate with that of the animals in group A of the control diet. This illustrates the well-known fact that the presence of copper, as well as of iron, is of considerable importance in the formation of red blood cells. However, in the case of humans, the diet almost invariably contains copper in an amount sufficient to supply the physiologic requirements of the body and therefore commensurate therapy of human patients would not require the addition of a copper-containing compound to the therapeutic composition.

The effect upon anemic conditions of the novel compositions of this invention was compared with the effect of ferrous sulfate which is a common component of prior art therapeutic compositions and, which is representative of such hematinic preparations. Thus, a number of rats were divided into groups E, F, G, H, I and J. Group E was a control group and the animals therein were fed a normal diet. The animals in group F received a non-medicated iron- and copper-deficient diet. The animals in groups G, H, I and J received the same iron- and copper-deficient diet to which was added certain supplements. The supplement for the group G animals consisted of 2.5 mg. of iron-P.A.A. per feeding, that for the group H animals consisted of 2.5 mg. of ferrous sulfate, $FeSO_4 \cdot 7H_2O$, per feeding, that for the group I animals consisted of 2.5 mg. of iron-P.A.A. plus 0.25 mg. of copper sulfate, $CuSO_4 \cdot 5H_2O$, per feeding and that for the group J animals consisted of 2.5 mg. of ferrous sulfate plus 0.25 mg. of copper sulfate.

Red blood cell counts were determined for all groups except group E at 0, 9, 16, 23 and 30 days. Counts for the animals in group E were taken only at 0 and 30 days. The results of these tests are shown in Table II.

TABLE II

*Red Blood Cell Count, Millions per Ml.*

| Group | Days After Initial Administration | | | | |
|---|---|---|---|---|---|
| | 0 | 9 | 16 | 23 | 30 |
| E | 4.80 | | | | 6.30 |
| F | 3.45 | 1.95 | 1.85 | 1.00 | |
| G | 3.85 | 2.85 | 3.60 | 2.50 | 3.35 |
| H | 3.75 | 3.35 | 3.80 | 2.20 | 5.50 |
| I | 3.60 | 5.15 | 6.10 | 4.75 | 5.30 |
| J | 3.50 | 5.90 | 6.85 | 5.15 | 5.80 |

From the data given in Table II, it may be seen that administration of the resinous iron salt of the present invention and ferrous sulfate, groups G and H respectively, produced quite similar values of red blood cell counts and further, that the administration of mixtures of each of these two compounds with copper sulfate also produced red blood cell counts of approximately equal orders of magnitude, these, however, being greater than the corresponding values of the red blood cell counts of the animals which received no copper. Thus the tests in Table II again illustrate the importance of copper in the formation of red blood cells in animals. More importantly, Table II also shows that the beneficial aspects of the novel compositions of this invention are commensurate with those of ferrous sulfate in their effect on hematopoiesis.

The beneficial effects obtainable by administration of the novel compositions of the invention to animals is also realized when these compositions are administered to humans. In vivo human studies show that the iron content of these compositions is incorporated by the body into the hemoglobin of the red blood cells. For example, a capsule was prepared containing 29 mg. of iron-P.A.A., comprising 5 mg. of elemental iron in the form of $Fe^{59}$ such that the dosage administered contained 15 microcuries of radioactivity. After ingestion of the capsule by an iron-deficient patient, having a total blood volume of about 4271 ml., blood samples were taken at intervals and the radio-activity measured by the procedure described by G. Kitzes et al., Journal of Biological Chemistry, vol. 155, page 653, 1944. These measurements showed, over a period of 16 days, that at least 15.1 percent of the iron content of the iron-P.A.A. was incorporated in the hemoglobin. The rate of increase of radioactive iron in the hemoglobin may be seen by reference to Table III.

TABLE III

| Time After Administration, Days | Total Percent of Iron in Dose Incorporated in Hemoglobin |
|---|---|
| 2 | 3.2 |
| 4 | 9.9 |
| 7 | 13.7 |
| 11 | 14.9 |
| 16 | 15.1 |

Similar tests were done in which radioactive ($Fe^{59}$) ferrous chloride was substituted for the radioactive iron-P.A.A. The results of one such test are given in Table IV. In this test, the anemic patient was given an aqueous solution containing 5 mg. of elemental iron in the form of ferrous chloride.

TABLE IV

| Time After Administration, Days | Total Percent of Iron in Dose Incorporated in Hemoglobin |
|---|---|
| 2 | 5.6 |
| 4 | 11.4 |
| 7 | 17.3 |
| 9 | 17.0 |

It is readily seen, by comparing the data of Table III with that of Table IV that the total amount of iron utilized by the human body is approximately the same for both iron-P.A.A. and ferrous chloride. Moreover, it will be noted that the rate of iron incorporation in the hemoglobin is relatively much slower when the compositions of the invention are used than when ferrous chloride is used as the source of iron. This is true despite the fact that the novel compounds are high in iron content, being superior in this respect to many prior art hematinic compounds and approximately equal to all others except a very few, such as ferric hydroxide. Surprisingly, however, despite their high iron content, the novel compositions of the invention do not exhibit the irritating and constipating effects produced by prior art hematinic compounds. This is believed to be due to the slow, gradual release of their iron content by the novel compounds as they traverse the gastro-intestinal canal. This theory is supported by the observed slow rate of incorporation in the hemoglobin of iron from the compounds of the invention. The superiority in this respect of the compositions of the invention over prior art hematinics is further illustrated by comparative studies of the effect of various iron compounds upon constipation in animals.

In carrying out these studies a number of rats were divided into four groups, the animals in the first group receiving a normal diet, while those in the second, third and fourth groups received, respectively, diets to which were added ferrous sulfate ($FeSO_4 \cdot 7H_2O$), iron-P.A.A. and ferric chloride ($FeCl_3 \cdot 6H_2O$). Each group of animals was further subdivided into four sub-groups of two animals each, and receiving daily, respectively, 5, 10, 20 and 40 mg. per animal of additive. The results of a series of such studies are given in Table V.

The pellets or stools of each animal in each sub-group were counted each 24 hours and the 24-hour numbers averaged over the period of medication to give the values of Table V.

TABLE V

*Average Number of Pellets 24 Hours After Last Administration of Medication*

| Compound | 9 Days After Medication Begun | | | | | 14 Days After Medication Begun | | | | | 23 Days After Medication Begun | | | | |
|---|---|---|---|---|---|---|---|---|---|---|---|---|---|---|---|
| | 0 | 5[1] | 10 | 20 | 40 | 0 | 5 | 10 | 20 | 40 | 0 | 5 | 10 | 20 | 40 |
| Control | 87 | | | | | 84 | | | | | | | | | |
| Ferrous sulfate | | 83 | 70 | 88 | 62 | | | | | | | | | | |
| Iron-P.A.A. | | 99 | 79 | 81 | 90 | | 84 | 68 | 68 | 77 | | 73 | 73 | 74 | 83 |
| Ferric chloride | | | | | | | 72 | 75 | 56 | 48 | | | | | |

[1] Dose, mg. per animal.

The data of Table V indicate no significant difference in the number of pellets of the control animals and those receiving iron-P.A.A. Moreover, there is no clear change when the dosage of iron-P.A.A. is increased up to 40 mg. per day per animal, even after a medication period of 23 days. On the other hand, both ferrous sulfate and ferric chloride show significant deviations from the controls when given in dosages as low as 5 to 10 mg. and increase of the dosage of these prior art compounds results in increasingly severe constipation.

The non-toxicity of iron-P.A.A. may be seen by reference to Table VI which shows the results of tests conducted to determine the fatalities produced in rats following oral administration of iron-P.A.A. and ferrous sulfate.

TABLE VI

| Dosage, gms./kg. of body weight | Drug | |
|---|---|---|
| | Ferrous sulfate | Iron-P.A.A. |
| 0.3 | 0/8 | |
| 0.4 | | 0/8 |
| 0.6 | 0/8 | |
| 0.8 | | 0/8 |
| 1.2 | 0/8 | |
| 1.6 | | 0/2 |
| 2.4 | 5/6 | |
| 3.2 | | 0/6 |

The data of Table VI show that, up to the massive dose of 3.2 grams per kilogram, no toxicity was observed in the rat following oral administration of iron-P.A.A. By contrast, the commonly used hematinic compound, ferrous sulfate, showed fatalities in five out of six animals at the lower dosage of 2.4 grams per kilogram.

Because of their non-toxicity and the freedom from undesirable side effects, the compositions of the invention may be safely administered in any dosage reasonably required to correct iron-deficient conditions. For example, dosages from about 10 to about 250 mg. or more per day may be utilized, depending upon such factors as nature and degree of the iron-deficiency, age, weight, sex, and general condition of the patient as well as the natural iron content of the diet.

A suitable tonic-type hematinic preparation in accordance with the invention is exemplified by the following formulation, wherein the concentrations of the various components are given in percent by weight of the composition.

EXAMPLE I

| Component: | Percent |
|---|---|
| Water, deionized | 61.70 |
| Ethanol, 95 percent | 11.00 |
| Dextrose, U.S.P. | 25.00 |
| Iron-P.A.A. | 0.50 |
| Methylcellulose | 1.30 |
| Wine | 0.45 |
| Flavors | 0.05 |
| | 100.00 |

A suitable dosage of the preparation of Example I is a total of two tablespoons (30 ml.) per day, taken morning and evening. Thus, iron-P.A.A., analyzing 20 percent by weight of iron would provide, in a 30 ml. dose, about 30 mg. of iron.

The formulation of Example I may be modified by increasing the iron-P.A.A. content as desired for producing more concentrated preparations.

Preparations incorporating the novel compounds of the invention may take other useful medicinal forms, as capsules, powders or tablets. Suitable additives such as extenders, disintegrating agents, lubricants, etc. as well as other therapeutic agents, may be added as indicated by the form taken or by the particular abnormal condition for the treatment of which the composition is intended. For example, suitable combinations include, in addition to the iron-polymer compound, vitamins or proteins which aid in hemoglobin production or other hemopoietic agents such as pteroylglutamic acid or liver extract. In the treatment of iron deficiencies caused by infestation with worms, such as *Ankylostoma duodenale, Unicinaria americana, Necator americanus,* etc. the novel compositions may comprise, in addition to the iron-polymer compound, an anthelmintic such as hexylresorcinol, tetrachloroethylene with oil of chenopodium, santonin or piperazine. In those instances where the cause of the iron deficiency is unknown, combinations of several of the above-mentioned therapeutic agents may be administered. Due to the relatively small amounts of the novel iron compounds which are required in the treatment of anemia, it is feasible to incorporate therapeutically effective amounts of these novel compounds in foodstuffs in a variety of forms such as liquids, thickened creams, custards, puddings and the like. The ability of certain of the contemplated polymers to form soft gels when mixed with water, enhances the value of the novel compositions for such uses. Thus, it has been found that those polymers of the aforementioned Brown Patent No. 2,798,053 which consists of acrylic acid crosslinked with from about 0.75 to about 1.5 percent, by weight of crosslinked polymer, of polyallyl sucrose possess an extremely high degree of water-swellability. Ferric salts of such polymers retain a portion of this water-swellability even in the low concentrations used in the hematinic compositions contemplated herein, hence tend to act as bulk laxatives, thereby assisting in overcoming the constipation normally attendant upon the oral administration of iron compounds.

It is to be understood that the foregoing specific examples are given merely to illustrate the principles of the invention and are not to be construed as limitations of the scope thereof.

What is claimed is:

1. A pharmaceutical hematinic preparation comprising an iron salt of an acrylic acid polymer crosslinked with from about 0.75 to about 1.5 percent, by weight of polymer, of a sucrose ether having at least two hydroxyl groups per molecule substituted with allyl groups, said salt containing from about 15 to about 20 percent, by weight thereof, of iron.

2. The method of combatting physiologic iron-deficient anemias which comprises orally administering an iron salt of a polymer consisting of acrylic acid crosslinked with from about 0.75 to about 1.5 percent, by weight of polymer, of polyallyl sucrose.

References Cited in the file of this patent

UNITED STATES PATENTS

| 2,498,687 | Larsen | Feb. 28, 1950 |
| 2,764,518 | Thurmon | Sept. 25, 1956 |
| 2,798,053 | Brown | July 2, 1957 |
| 2,816,060 | Carter | Dec. 10, 1957 |
| 2,820,740 | London et al. | Jan. 21, 1958 |
| 2,841,526 | Gustus | July 1, 1958 |
| 2,949,366 | Bertsch et al. | Aug. 19, 1958 |

FOREIGN PATENTS

| 572,229 | Great Britain | Sept. 28, 1945 |

OTHER REFERENCES

Chemical Arbstracts (1), vol. 48, pp. 6905i–6906b, 1954; (2) vol. 49, pp. 1345a–b, 1955.

Chaudhry et al.: J. Pharmacy and Pharmacology, vol. 8, pp. 975–86, November 1956.

Ludwig et al.: P.S.E.B.M., 79:1, pp. 176–9, January 1952.

UNITED STATES PATENT OFFICE
CERTIFICATE OF CORRECTION

Patent No. 3,027,303                      March 27, 1962

George L. Wolcott

It is hereby certified that error appears in the above numbered patent requiring correction and that the said Letters Patent should read as corrected below.

Column 8, line 27, for "2,949,366" read -- 2,848,366 --.

Signed and sealed this 3rd day of July 1962.

(SEAL)
Attest:

ERNEST W. SWIDER
Attesting Officer

DAVID L. LADD
Commissioner of Patents